United States Patent
Alumbaugh et al.

(10) Patent No.: US 7,565,244 B2
(45) Date of Patent: Jul. 21, 2009

(54) METHOD AND SYSTEM FOR REMOVING EFFECTS OF CONDUCTIVE CASINGS AND WELLBORE AND SURFACE HETEROGENEITY IN ELECTROMAGNETIC IMAGING SURVEYS

(75) Inventors: David Alumbaugh, Berkeley, CA (US); Ping Zhang, Albany, CA (US); Edward Nichols, Berkeley, CA (US); Frank Morrison, Berkeley, CA (US); Aria Abubakar, North Reading, MA (US); Tarek Habashy, Burlington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/768,975

(22) Filed: Jun. 27, 2007

(65) Prior Publication Data

US 2009/0005992 A1 Jan. 1, 2009

(51) Int. Cl.
*G01V 1/40* (2006.01)
(52) U.S. Cl. ............... 702/6; 702/7; 702/11; 324/323; 324/334; 324/339; 367/29; 367/49
(58) Field of Classification Search .............. 702/6, 702/7, 11; 324/334, 323, 339; 367/29, 49
See application file for complete search history.

(56) References Cited

U.S. PATENT DOCUMENTS 5,469,062 A 11/1995 Meyer, Jr.
6,294,917 B1 * 9/2001 Nichols .................. 324/339
6,393,363 B1 * 5/2002 Wilt et al. .................. 702/6
2006/0015258 A1 1/2006 Dubourg et al.

OTHER PUBLICATIONS

Abubakar et al., "A fast and rigorous 2.5D inversion algorithm for cross-well electromagnetic data," *SEG Annual Meeting*, Houston, TX, pp. 534-538, 2005.
Farquharson and Oldenburg, "Non-linear inversion using general measures of data misfit and model structure," *Geophys. J. Int.*, 134:213-227, 1998.
Habashy and Abubakar, "A general framework for constraint minimization for the inversion of electromagnetic measurements," *Progress in Electromagnetics Research*, PIER 46:265-312, 2004.

(Continued)

*Primary Examiner*—Tung S Lau
*Assistant Examiner*—Sujoy K Kundu
(74) *Attorney, Agent, or Firm*—Jonna Flores; Darla Fonseca; Jaime Castano (57) ABSTRACT

Characterizing a reservoir with electromagnetic imaging surveys includes normalizing measured voltage data by transmitter moment, sorting the normalized voltage data into common receiver profiles, densely resampling transmitter locations using common positions for the receiver profiles, coarsely resampling the data at discreet transmitter locations, defining a starting model for inversion, weighting the data by a factor, converting the normalized voltage data to ratios, calculating a conductivity image using a ratio inversion method, and verifying that an inversion has converged and the image is geologically reasonable. The image can then be displayed. The invention can be used for cross-well, surface-to-borehole, and borehole-to-surface measurements by which the effects of steel casing are reduced.

21 Claims, 10 Drawing Sheets

OTHER PUBLICATIONS

Newman, "Deep transient electromagnetic soundings with a grounded source over near surface conductors," *Geophys. J. Int.*, 98:587-601, 1989.

Torres-Verdin and Bostick, "Principles of spatial electric filed filtering in magnetotellurics: electromagnetic array profiling (EMAP)," *Geophysics*, 57(4):603-622, 1992.

Uchida, Lee and Wilt, "Effect of a steel casing on crosshole EM measurement," *1991 Annual Meeting SEG*.

Van den Burg, Kooij and Kleinman, "Image reconstruction from Ipswich data—III," *IEEE Antennas and Propagation Magazine*, 41(2):27-32,1999.

Wu and Habashy, "Influence of steel casings on electromagnetic signals," *Geophysics*,59(3):378-390, 1994.

Augustin, A.M. et al., A Theoretical Study of Surface-to-Borehole Electromagnetic Logging in Cased Holes, Geophysics vol. 54, No. 1, Jan. 1989, pp. 90-99.

\* cited by examiner

METHOD AND SYSTEM FOR REMOVING EFFECTS OF CONDUCTIVE CASINGS AND WELLBORE AND SURFACE HETEROGENEITY IN ELECTROMAGNETIC IMAGING SURVEYS

FIELD OF THE INVENTION

The present invention relates in general to electromagnetic imaging surveys used for characterizing hydrocarbon reservoirs and ground-water aquifers.

BACKGROUND

One of the major issues related to current surveying methods using these electromagnetic imaging techniques is the effect of steel casing on the fields measured by borehole sensors. This has been detailed in the literature review contained in U.S. Pat. No. 6,294,917, which is hereby incorporated by reference herein, which also provides a method for calculating ratios of data to remove the effects of steel casing. Problems are also associated with near-surface heterogeneity when any sources or sensors are located on the earth-surface. Examples of these effects in surface EM measurements can be found for magnetotelluric measurements in Torres-Verdin, Carlos, and Bostick Francis. X., 1992, *Principles of spatial surface electric field filtering in magnetotellurics: Electromagnetic array profiling* (EMAP), Geophysics, 57, 603-622, and for transient EM measurements employing a grounded source in Strack, K. M., 1992, *Exploration with Deep Transient Electromagnetics*, Elsevier, Amsterdam, and Newman, G. A., 1989, *Deep transient electromagnetic soundings with a grounded source over near surface conductors*: Geophys. J. Int., 98, 587-601. Because near surface heterogeneity, as well as cultural structures such as pipelines, metal fences, and buildings, can affect STB or BTS measurements, methods to remove these effects will help to improve image accuracy.

Another method is described in U.S. Pat. No. 6,393,363, which details a numerical modeling based method for correcting data collected in steel cased wells to produce a 'calibrated' data set free of casing effects. However, this method relies on prior knowledge of the geoelectric structure surrounding the wells, and the degree of error in the calibrated data that is introduced by incorrect model assumptions is unknown. Although the ratio method outlined in U.S. Pat. No. 6,294,917 has the draw back of decreasing the signal-to-noise ratio of the data that are used for imaging, it makes no assumptions about the structure that the user is trying to image.

Therefore, it is a desire to provide an improved system and method for reducing distortion caused by near-surface heterogeneity and removing the effects of steel casing in wellbores.

SUMMARY OF THE INVENTION

The present invention addresses the foregoing needs by providing a data processing system and flow for cross-well, surface-to-borehole, and borehole-to-surface measurements by which the effects of steel casing will be reduced or even removed, and distortions caused by near-surface heterogeneity significantly reduced if not entirely removed. The processing flow comprises two parts: 1) a pre-inversion data reduction, and 2) a data inversion methodology. Two types of ratios are described: a normalization technique that makes use of a constant reference transmitter and/or receiver location to calculate the ratios for all other sensor combinations, and a multiple-offset data ratio configuration. This is in addition to the disclosure in U.S. Pat. No. 6,294,917, which covers ratio techniques, as this disclosure a) outlines a detailed processing/imaging scheme for producing electrical resistivity images from ratios of data, and b) extends the technique to cover STB and BTS configurations.

The present invention further provides systems and methods for characterizing a reservoir, comprising the steps of normalizing measured voltage data by transmitter moment, sorting the normalized voltage data into common receiver profiles, densely resampling transmitter locations using common positions for the receiver profiles, coarsely resampling the data at discreet transmitter locations, defining a starting model for inversion, weighting the data by a factor, converting the normalized voltage data to ratios, calculating a conductivity image using a ratio inversion method, and verifying that an inversion has converged and the image is geologically reasonable.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein:

FIG. 9 illustrates in FIG. 9A unprocessed cross borehole data where the receiver well is cased with steel, and in FIG. 9B results of applying a double STRL ratio technique shown in FIG. 9A;

FIG. 10 illustrates in FIG. 10A an image resulting from inversion of ratio data, and in FIG. 10B an image resulting from inversion of model-based calibration data.

DETAILED DESCRIPTION

Refer now to the drawings wherein depicted elements are not necessarily shown to scale and wherein like or similar elements are designated by the same reference numeral through the several views.

Figure 1A:
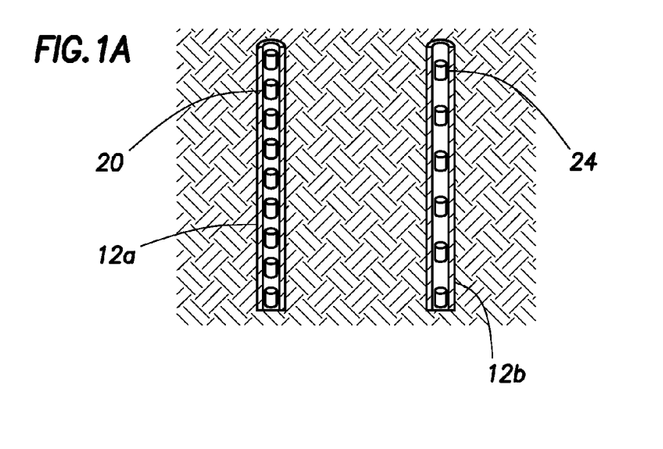
FIGS. 1A-1C illustrate schematics of source-receiver acquisition geometries.
Figure 1B:
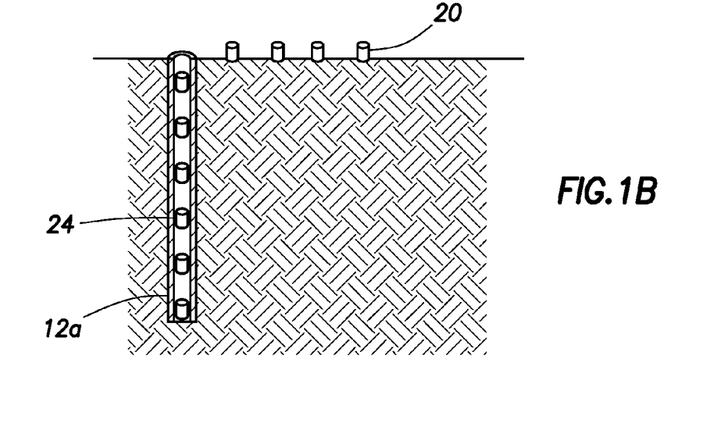
Figure 1C:
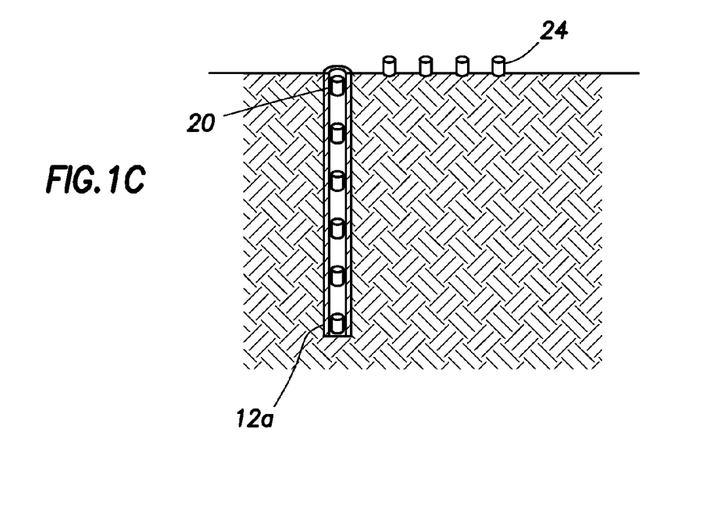

As illustrated in FIGS. 1A-1C, the present invention relates to cross borehole (CB) (FIG. 1A), surface-to-borehole (STB) (FIG. 1B), and borehole-to-surface (BTS) (FIG. 1C) electromagnetic (EM) imaging surveys whereby a series of electric or magnetic dipole sources 20 are energized in a borehole, on the surface of the earth, or near the seafloor, and measurements of magnetic and/or electric fields are made in a different borehole, or on the earth's surface or seafloor by receivers 24. Note that the borehole can be open, cased with a non-conductive liner such as fiberglass, or cased with a conductive material such as steel. The purpose of the survey is to non-intrusively provide an image of formation resistivity, including the location of resistors such as hydrocarbon bearing reservoirs, gas injection zones, and fresh-water aquifers, and conductors such as produced by the presence of saline water, mineralized zones, and shales and clay. These images will allow for the characterization of hydrocarbon reservoirs and ground-water aquifers, for locating of bypassed oil, for monitoring reservoir production, groundwater and gas injection process, and for imaging saltwater intrusion into aquifers.

Figure 3:
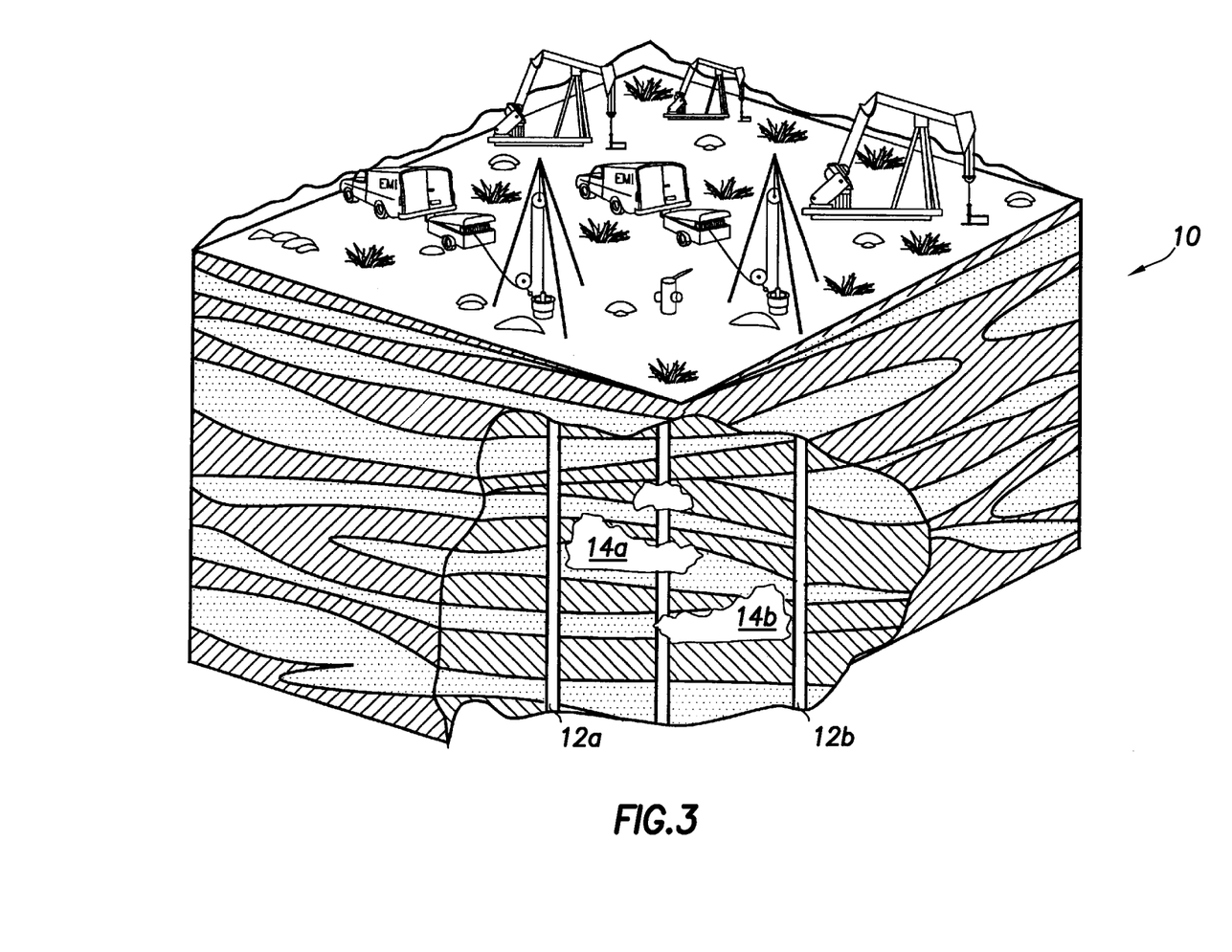
FIG. 3 illustrates a perspective view of a geologic formation undergoing electromagnetic analysis in accordance with embodiments of the present invention.

Referring to FIG. 3, a geologic formation 10 under analysis includes one or more boreholes, shown generally as 12$a$ and 12$b$ and a reservoir of resources of interests, in this example one or more reservoirs of hydrocarbons, shown generally as 14$a$ and 14$b$. Typically, at least one of the boreholes 12$a$ and 12$b$ is cased with a conductive liner 16$a$ and 16$b$. The equipment employed to analyze the geologic formation is described in U.S. Pat. No. 6,294,917, and is therefore not repeated herein for the sake of simplicity. As illustrated in FIG. 1, analysis of geological formation 10 may also employ transmitters and/or receivers on the surface of earth in addition to the transmitters and/or receivers disposed within the boreholes.

Figure 2:
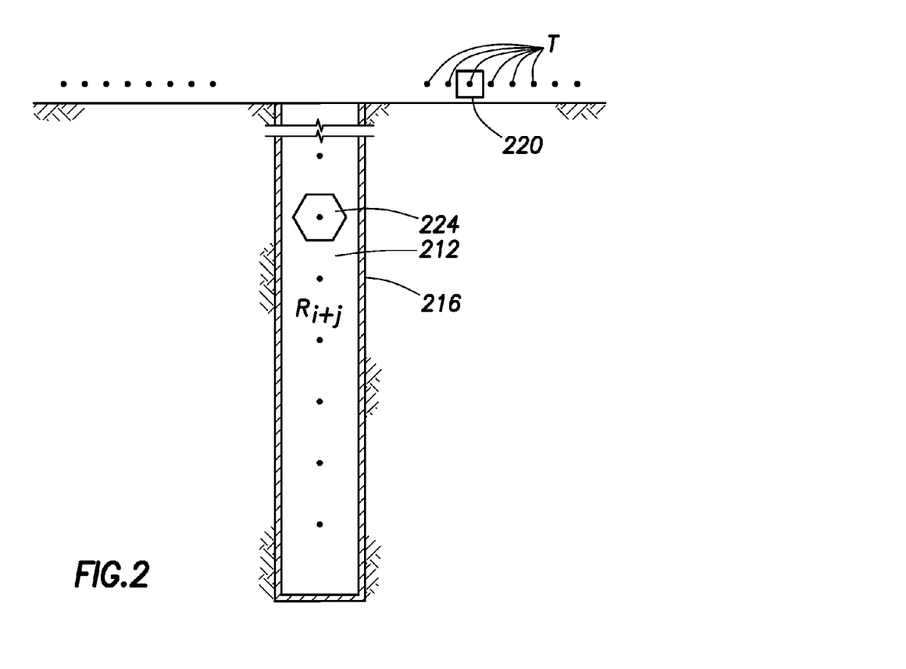
FIG. 2 illustrates a partial simplified plan view of an electromagnetic measurement system in accordance with embodiments of the present invention.

For example, as illustrated in FIG. 2, in another embodiment determining characteristics of a geologic formations using a single borehole 212 having a conductive liner 216 disposed therein, the transmitter 220 may be positioned on the surface of the geologic formation surrounding the borehole 212. One or more receivers 224 are disposed in the borehole 212. In this configuration, the receiver may be positioned at differing positions within the borehole 212, e.g., $R_j$ and $R_{j+1}$. The transmitter 220 is moved to differing positions radially from the axis of the borehole 212. Alternatively, the transmitter positions may be located within the borehole 212 while the receiver positions are on the surface of the formation.

Currently, the processing of cross borehole data consists of two major steps. The first step involves converting the data from measured voltage in either a steel cased well or 'open hole' to the magnetic field that would be measured in an open hole. This step includes a correction for the geometry of the wells (more detail is provided below in the processing description), and involves the use of a starting or a geoelectric model as described in U.S. Pat. No. 6,393,363. The second step involves the 'inversion' of the calibrated data to produce a 2D (or 3D) image of electrical resistivity. One way to accomplish this imaging procedure is via a computer algorithm that numerically minimizes the following cost function:

$$\phi^s(m) = \Sigma_{i=1}^{Nd} W_{d_i} |S_i(m) - H_i|^2 \qquad (1)$$

Here the $H_i$'s form a vector (H) of measured data of length $N_d$, the $S_i(m)$ values represent a vector (S(m)) of numerical data calculated by a forward modeling algorithm that accounts for 2D or 3D geologic structure, m is the model vector of resistivities at different positions between and around the wells to be reconstructed, and $W_d$ is a data weighting matrix that can include information about the quality of the data in a statistical sense. For electromagnetic data, the relationship between S(m) and m is nonlinear, and thus the inversion is solved iteratively by linearizing about a current model, and iteratively solving for an updated model. One way of solving the problem is to use a method such as that outlined in Farquharson, C. G., and Oldenburg, D. W., *Non-linear inversion using general measures of data misfit and model structure*, Geophys. J. Int., 134, 213-227, 1998 whereby an updated model is solved using the expression $$m^p = (J^T W_d^T R_d W_d J + \lambda W_n^T R_m W_m)^{-1} (J^T W_d^T R_d W_d (H - S(m^{p-1})) + J^T W_d^T R_d W_d J m^{p-1} + \lambda W_n^T R_m W_m m^{ref}) \qquad (2)$$

Here $m^p$ is the updated model solved for at the $p^{th}$ iteration, $m^{p-1}$ and $S(m^{p-1})$ are the model and predicted data from the previous iteration, and $m^{ref}$ is a reference or apriori model used to get as close to the true model as possible before starting the inversion procedure. J is the Jacobian or sensitivity matrix which relates small changes in data to small changes in model parameters, i.e.

$$J_{i;q} = \partial S_i(m^{p-1})/\partial m_q \qquad (3)$$

where i represents the i'th predicted data value, and q the q'th model parameter. Note, $\lambda W_m$ is a constraint matrix, and $R_d$ and $R_m$ are data and model reweighting matrices, all of which are introduced to constrain to the model and cost-function to have certain properties, and are unimportant to the data ratio method described herein. Note in general, the inversion algorithm is designed to iteratively numerically determine a model that reduces the norm given by Equation (1) from one iteration to the next. The iterative process is terminated when either the norm measured by Equation (1) converges, or a predetermined number of iterations is reached. For more specifics on the inversion techniques that are employed see Farquharson, C. G., and Oldenburg, D. W., *Non-linear inversion using general measures of data misfit and model structure*, Geophys. J. Int., 134, 213 227, 1998 and Abubakar, A., Habashy, T. M., Druskin, V. L., Alumbaugh, D., Zhang, P., Wilt, M., Denaclara, H., Nichols, E., and Knizhnerman, L., *A fast and rigorous 2.5D inversion algorithm for cross-well electromagnetic data*, presented at the 2005 Annual Meeting of the Society of Exploration Geophysicists, 2005.

As outlined in U.S. Pat. No. 6,294,917, as well as within the publications highlighted in the patent (e.g., Wu, X., and Habashy, T., *Influence of steel casings on electromagnetic signals*, Geophysics, 59, 378-390, 1994; Uchida, T., Lee, K. H., and Wilt, M., *Effect of a steel casing on crosshole EM measurements*, presented at the 1991 Annual Meeting of the Society of Exploration Geophysicists, 1991), when data are collected in crosswell mode where one well, for example the receiver well as shown in FIG. 4A, is cased with a conductive liner, the resulting measurement is simply the product of a complex casing distortion coefficient and the formation response we wish to recover, i.e., $$H_{i,k}^c = \gamma_{r_k} H_{i,k}^0 \qquad (4)$$

Figure 4A:
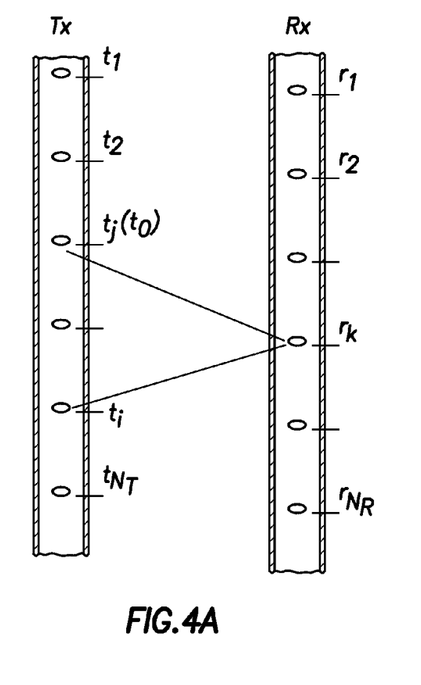
FIGS. 4A and 4B illustrate cross borehole geometries used to explain single and double ratios.

Here $H_{i,k}^c$ refers to the measurement for the i'th transmitter and k'th receiver in FIG. 4A, $H_{i,k}^0$ is the formation response to recover, and $\gamma_{r_k}$ is the casing distortion parameter for the k'th receiver position. Similarly, if both wells are cased with a conductive liner such as shown in FIG. 4B, the expression becomes $$H_{i,k}^c = \gamma_{t_i} \gamma_{r_k} H_{i,k}^0 \qquad (5)$$

where now $\gamma_{t_i}$ is the casing distortion parameter associated with the i'th transmitter position. Note that the $\gamma$'s can also represent distortions caused by near wellbore structure, or surface heterogeneity and cultural structures in the case of STB or BTS measurements.

U.S. Pat. No. 6,294,917 outlines a method whereby ratios of measured data are calculated to remove the casing distortions. For example, to remove the casing distortion caused by the conductive liner surrounding the k'th receiver in FIG. 4A, a ratio can be calculated between the two data points collected with the transmitter located at the i and j transmitter locations to yield a new 'single-ratio' (SR) datum. Explicitly, this ratio is given as $$H_{ij,k}^{sr} = \frac{H_{i,k}^c}{H_{j,k}^c} = \frac{k_{r_k} H_{i,k}^0}{k_{r_k} H_{j,k}^0} = \frac{H_{i,k}^0}{H_{j,k}^0} \qquad (6)$$

Figure 4B:
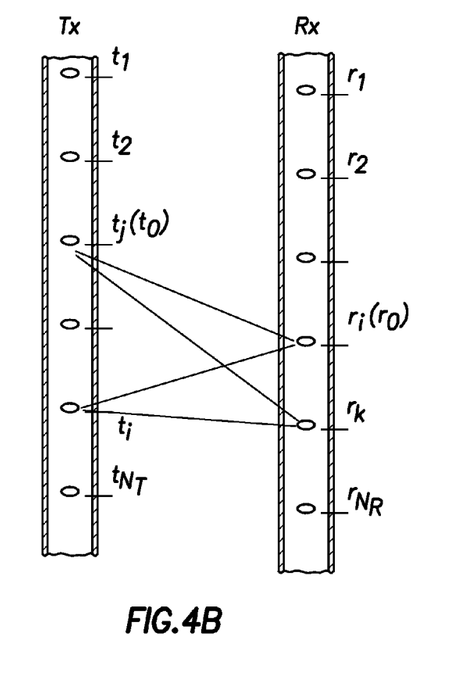

Similarly, if both casings are conductive as in FIG. 4B, a 'double-ratio' (DR) can be computed that combines four measurements with two transmitter and two receiver positions into a single datum that is free of casing effects:

$$H_{ij,kl}^{dr} = \frac{H_{ij,k}^{sr}}{H_{ij,l}^{sr}} = \frac{H_{i,k}^c}{H_{j,k}^c} \bigg/ \frac{H_{i,l}^c}{H_{j,l}^c} = \frac{\frac{k_{t_i} k_{r_k} H_{i,k}^0}{k_{t_j} k_{r_k} H_{j,k}^0}}{\frac{k_{t_i} k_{r_l} H_{i,l}^0}{k_{t_j} k_{r_l} H_{j,l}^0}} = \frac{H_{i,k}^0 H_{j,l}^0}{H_{j,k}^0 H_{i,l}^0} \qquad (7)$$

Although any combination of the data can be used as long as they obey Equations (6) or (7), two specific types of ratios are currently employed. The 'Single Transmitter/Receiver Location' (STRL) ratio uses data collected with transmitters and/or receivers positioned at constant reference locations within the two wells (or on the surface) to normalize all other measurements. For example, in FIGS. 4A and 4B the $t_0$ transmitter and $r_0$ receiver locations would be employed to normalize all data points, and the thus the value of j and l in Equations (6) and (7) are constants. An alternative method is to use all possible combinations of transmitters and receivers to generate the ratio data. Because this process results in many more ratio values compared to the original data set, this is referred to as the 'Maximum Data' (MD) ratio formulation.

By taking these ratios, the data has essentially changed and inverted, and thus the cost function given in Equation (1) must change. For the single ratio the cost function becomes $$\phi^s(m) = \sum_{k=1}^{N_R} \sum_{f_k(i,j)} W_{d_{ij,k}} \left| \frac{S_{i,k}(m)}{S_{j,k}(m)} - \frac{H_{i,k}}{H_{j,k}} \right|^2 \qquad (8)$$

where $N_R$ refers to the number of receivers, and the summation $\Sigma_{f_k(i,j)}$ denotes summation a given set of transmitter pairs (i,j) for a fixed receiver position k. This will be referred to as the Single-Ratio I cost function. Note that the data weights, $W_{d_{ij,k}}$, are now based on the estimated noise in the ratios rather than the original data values. Similarly, the double-ratio cost function is given by $$\phi^d(m) = \sum_{f(i,j;k,l)} W_{d_{ij,kl}} \left| \frac{S_{i,k}(m)S_{j,l}(m)}{S_{i,l}(m)S_{j,k}(m)} - \frac{H_{i,k}H_{j,l}}{H_{j,k}H_{i,l}} \right|^2 \qquad (9)$$

where symbol $\Sigma_{f(i,j;k,l)}$ denotes summation over the appropriate combination of transmitters and receivers, depending on whether the STRL or MD ratio formulation is employed. This cost function will be referred to as representing the Double-Ratio I approach for inverting the data. An additional set of cost functions for use in the inversion is described below in the section entitled "Alternative Cost Functions".

One additional side note is that in addition to removing the casing distortion coefficients, the ratio techniques also cancel the calibration constants that are needed to convert the measured voltages to electric/magnetic fields. Thus, the ratio can be applied to the raw data directly rather than having to run the measured voltages through a calibration procedure to convert them to electromagnetic fields.

After the ratios have been calculated, they are inverted using the numerical procedures described briefly above, and in more detail in Farquharson, C. G., and Oldenburg, D. W., *Non-linear inversion using general measures of data misfit and model structure*, Geophys, J. Int., 134, 213-227, 1998 and Abubakar, A., Habashy, T. M., Druskin, V. L., Alumbaugh, D., Zhang, P., Wilt, M., Denaclara, H., Nichols, E., and Knizhnerman, L., *A fast and rigorous 2.5 D inversion algorithm for cross-well electromagnetic data*, presented at the 2005 Annual Meeting of the Society of Exploration Geophysicists, 2005.

An additional complication is provided by the fact that the computation of the Jacobian matrix is more cumbersome because the data consists of ratios of field values rather than the EM fields themselves. The single-ratio Jacobian is computed using the chain rule to produce the expression $$J_{ij,k;q}^{sr} = \frac{S_{j,k}(m) \frac{\partial S_{i,k}(m)}{\partial m_q} - S_{i,k}(m) \frac{\partial S_{j,k}(m)}{\partial m_q}}{(S_{j,k}(m))^2} \qquad (10)$$

while the double-ratio Jacobian has the form $$J_{ij,kl;q}^{dr} = \frac{1}{(S_{j,k}(m)S_{i,l}(m))^2} \qquad (11)$$

$$\left[ S_{j,k}(m)S_{i,l}(m) \left( S_{i,k}(m) \frac{\partial S_{j,l}(m)}{\partial m_q} + S_{j,l}(m) \frac{\partial S_{i,k}(m)}{\partial m_q} \right) - \right.$$

$$\left. S_{i,k}(m)S_{j,l}(m) \left( S_{j,k}(m) \frac{\partial S_{i,l}(m)}{\partial m_q} + S_{i,l}(m) \frac{\partial S_{j,k}(m)}{\partial m_q} \right) \right]$$

Note that these expressions simply contain products of the computed fields for different transmitter/receiver combinations with the normal Jacobian matrix elements as defined by Equation (3). For computational efficiency, the normal Jacobian can be computed once and stored, and then algebraically combined with computed field values at the receivers as outlined in Equations (10) and (11). This avoids having to recomputed certain elements of the normal Jacobian matrix multiple times.

Alternative Cost Functions

The cost functions defined in Equations (8) and (9) are derived directly from the ratios themselves. However, these functionals may not provide the most-robust method for inverting the data. Thus, developed are additional cost-functions that provide different characteristics in terms of stability and robustness. Let the subscripts i and j denote the transmitter numbering and the subscripts k and l denote the receiver numbering. $N_R$ is the total number of receivers and $N_S$ is the total number of transmitters.

Single Ratio:

Using the single ratio defined in Equation (6), the unknown model parameters are inverted for by minimizing the following cost function:

$$\phi^s(m) = \frac{\sum_{k=1}^{N_R} \sum_{f_k(i,j)} \left|\frac{S_{i,k}(m)}{S_{j,k}(m)} - \frac{H_{i,k}}{H_{j,k}}\right|^2}{\sum_{k=1}^{N_R} \sum_{f_k(i,j)} \left|\frac{H_{i,k}}{H_{j,k}}\right|^2} \quad (12)$$

The summation $\Sigma_{f_k(i,j)}$ denotes summation over all transmitter pairs (i,j) for a fixed receiver position k. Note that this is very similar to Equation (8) with $$\sum_{k=1}^{N_R} \sum_{f_k(i,j)} \left|\frac{H_{i,k}}{H_{j,k}}\right|^2$$

replacing $W_{d_{ij,k}}$. This method is referred to as the Single-Ratio II approach.

The disadvantage of the above cost function is that it amplifies the effect of noise in the data by taking the ratio of the measured data. An alternative form of the cost function that can reduce the effect of noise is given by:

$$\phi^s(m) = \frac{1}{N_R} \sum_{k=1}^{N_R} \frac{\sum_{f_k(i,j)} \left|H_{j,k}\frac{S_{i,k}(m)}{S_{j,k}(m)} - H_{i,k}\right|^2}{\sum_{f_k(i,j)} |H_{i,k}|^2} \quad (13)$$

This method is referred to as the Single-Ratio III approach. Note that by normalizing the data misfit by the factor $\Sigma_{f_k(i,j)} |H_{i,k}|^2$, in effect, the influence of casing on all data measured at the k-th receiver is significantly reduced.

Double Ratio:

In this case, and by using the double ratio method, the unknown model parameters are inverted for by minimizing the following cost function:

$$\phi^d(m) = \frac{\sum_{f(i,j;k,l)} \left|\frac{S_{i,k}(m)S_{j,l}(m)}{S_{i,l}(m)S_{j,k}(m)} - \frac{H_{i,k}H_{j,l}}{H_{i,l}H_{j,k}}\right|^2}{\sum_{f(i,j;k,l)} \left|\frac{H_{i,k}H_{j,l}}{H_{i,l}H_{j,k}}\right|^2} \quad (14)$$

The symbol $\Sigma_{f(i,j;k,l)}$ denotes summation over all transmitter-receiver pairs. This method is referred to as the Double-Ratio II approach, which is similar to the cost function provided in Equation (9), with $$\sum_{f(i,j;k,l)} \left|\frac{H_{i,k}H_{j,l}}{H_{i,l}H_{j,k}}\right|^2$$

replacing $W_{d_{ij,k}}$.

The disadvantage of the above cost function is that it amplifies the effect of noise in the data by taking the ratio of the measured data. An alternative form of the cost function that can reduce the effect of noise is given by:

$$\phi^d(m) = \frac{1}{N} \sum_{f(k,l)=1}^{N} \frac{\sum_{f_{(k,l)}(i,j)} \left|H_{i,l}H_{j,k}\frac{S_{i,k}(m)S_{j,l}(m)}{S_{i,l}(m)S_{j,k}(m)} - H_{i,k}H_{j,l}\right|^2}{\sum_{f_{(k,l)}(i,j)} |H_{i,k}H_{j,l}|^2} \quad (15)$$

where $\Sigma_{f_{(k,l)}(i,j)}$ denotes the summation over all transmitter pairs (i,j) for a fixed receiver pair (k,l) and $$\sum_{f(k,l)=1}^{N}$$

denotes the summation over all receiver pairs (k,l). Note that by normalizing the data misfit by the factor $\Sigma_{f_{(k,l)}(i,j)} |H_{i,k}H_{j,l}|^2$, in effect, the influence of casing on all data measured at the k-l receiver pair is significantly reduced. This method is referred to as the Double-Ratio III approach.

Now that the background information has been provided, defined is a data processing flow for producing conductivity images from uncalibrated voltage data measured with the CB, STB, or BTS configurations that contain distortions caused by conductive liners or near-sensor heterogeneity. A flow chart illustrating a process in accordance with an embodiment of the present inventions is provided in FIG. 5.

Figure 5:
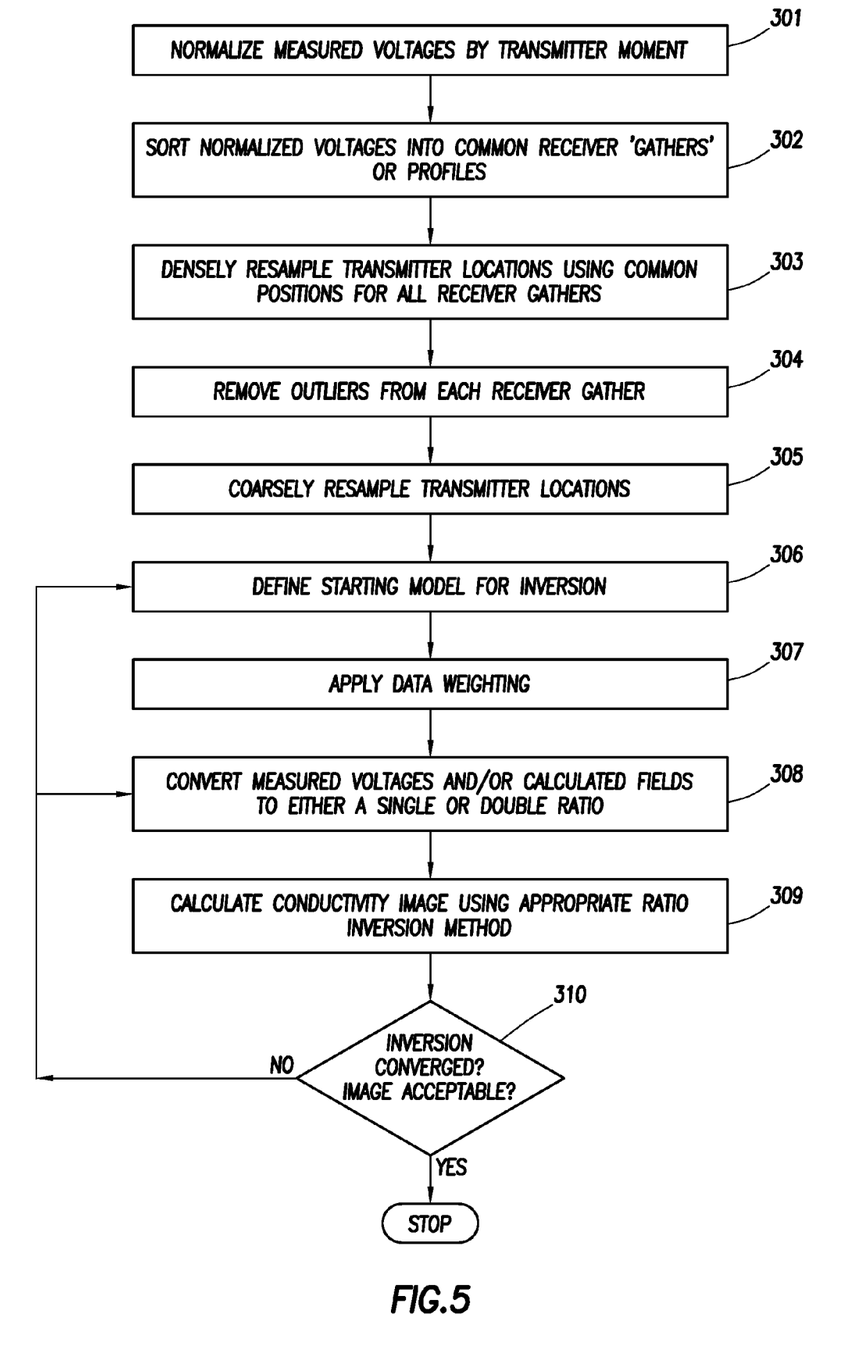
FIG. 5 illustrates a process configured in accordance with an embodiment of the present invention.

In step 301, a voltage is induced in the receiver solenoid by magnetic fields which are generated by a source (loop, solenoid or electric dipole) energized by known current I interacting with the medium under investigation. The strength of the magnetic measured voltage depends on the transmitter moment, which is unknown but linearly proportional to the current (I). To correct the measured voltage data to a constant transmitter moment they need to be normalized by some value that tracks the moment. This may be the transmitter current, or some other measurement that is proportional to the moment such as the voltage produced in a secondary solenoid that is wrapped around the transmitting solenoid, or a voltage measurement made between to grounding points placed very near to the source.

In step 302, the normalized voltages are sorted into common receiver 'gathers' or 'profiles.' A receiver gather (or profile) consists of the measurements made during a crosswell EM survey with the receiver fixed at a given depth. This step may be employed because, although the receivers are separated by a known distance (e.g., 5 m) and positioned at discreet locations, data are collected nearly continuously while the transmitter well is logged with the source. This procedure yields many more source than receiver positions. In addition, the source position may change slightly from run to run due to changes in logging speed, mispositioning, cable stretching, etc., and thus actual transmitter positions may be different for each receiver. Note, when the source is on the surface of the earth, this step may not be necessary as the exact same source-position can be reoccupied at any time.

In step 303, a dense-transmitter resampling of the data is performed. Because it is impossible to compute double ratios with each receiver having different transmitter points, the data need to be resampled/interpolated to a common set of transmitter locations. This involves first defining a common transmitter depth interval for all of the receiver profiles. Next, the minimum spatial sampling interval among all of the profiles is determined and used to define the transmitter positions that will be employed for all profiles; these positions are referred to as the 'global' transmitter locations. The last step is to use a spline technique to interpolate the data from the actual measurement locations to the global locations. For densely sampled transmitter locations such as that acquired in a cross borehole survey, this processing procedure introduces minimum alteration to the profiles while providing a common transmitter array for all receiver positions. Note, this step may not necessarily need to be applied to STB surveys when both the source and receivers are deployed in discreet locations.

In step 304, outliers from each receiver gather are removed. This step that can be done either manually, or using a 'despiking' computer algorithm.

In step 305, the data is coarsely resampled at discreet transmitter locations. This involves choosing a subset of the values that were output from step 303 using a depth-interval between adjacent transmitter points that is approximately equal to the minimum receiver sampling interval that is employed. For example, if the output from step 303 uses a dense sampling interval of 0.25 m, and the minimum receiver spacing is 2.5 m, the transmitter data could be chosen to be coarsely resampled every tenth data point, which would yield a transmitter at every 2.5 m.

In step 306, the starting model for the inversion is created/defined. If data are only available from the two wells that the crosswell data are collected in, this step consists of taking all available geologic, petrophysical, and geophysical information from these wells generating an estimate of the electrical conductivity at every point in space between and around the wells. If more data is available, for example from multiple wells, seismic data, etc., then the conductivity estimates are for a three-dimensional volume. This 'starting model' represents a best estimate of what the conductivity structure is prior to the inversion of the crosswell or STB data, and can be derived using various methods ranging from simple techniques such as laterally interpolating between two resistivity well logs, to more involved techniques such as using a geologic modeling software package, for example, such as Petrel (www.slb.com content/services/software/geo/petrel/).

In step 307, data weighting is applied. Different types of data weighting can be used. Most commonly, the data are weighted by the estimated noise in the measurements, which is generally given by some percentage of the maximum measured amplitude. A second method often used is to weight each data point by some percentage of the datum amplitude.

In step 308, the normalized voltages and/or calculated field values are converted to ratios. For an example to illustrate how to calculate a single ratio using field data, please refer to FIG. 4A, where the receiver is in a steel cased well and the transmitter is in an open well. Assume that the receiver is at a position designated by the 'k', and take the ratio between the data collected with the transmitter at position 'i' and position 'j'. From Equation (4), the measured fields can be written as the product of a complex casing distortion coefficient and the formation response to recover, that is:

$$H_{i,k}^c = \gamma_{r_k} H_{i,k}^0$$

$$H_{j,k}^c = \gamma_{r_k} H_{j,k}^0 \quad (16)$$

To remove the casing factor, take a ratio between two fields:

$$\frac{H_{i,k}^c}{H_{j,k}^c} = \frac{\gamma_{r_k} H_{i,k}^0}{\gamma_{r_k} H_{j,k}^0} = \frac{H_{i,k}^0}{H_{j,k}^0} \quad (17)$$

This single ratio provides a value which is now free from casing-distortion effects, and which can be used for interpretation. Similarly, double ratio fields may also be calculated.

In step 309, the appropriate form of the Jacobian Matrix is calculated depending on the cost function that is employed. The first task in this project is to calculate the Jacobian $J_{i,l;q}$ that is derived for the electromagnetic fields, where i represents the source position, l the receiver position, and q the model parameter for which to determine the sensitivity of the data. Note that $J_{i,l;q}$ is computed using the 'adjoint' method, and an example of how to calculate this matrix for a similar electromagnetic inversion scheme can be found in Newman and Alumbaugh (1997). Given this background, the single ratio Jacobian for the cost function shown in Equation (3) is given as:

$$J_{ij,k;q}^{sr} = \frac{S_{j,k}(m) J_{i,k;q} - S_{i,k}(m) J_{i,j;q}}{(S_{j,k}(m))^2}, \quad (18)$$

for Equation (7) it would be:

$$J_{ij,k;q}^{sr} = \frac{S_{j,k}(m) J_{i,k;q} - S_{i,k}(m) J_{i,j;q}}{(S_{j,k}(m))^2 \sum_{k=1}^{N_R} \sum_{f_k(i,j)} \left|\frac{H_{i,k}}{H_{j,k}}\right|^2} \quad (19)$$

and for the cost function given in Equation (8) the Jacobian is:

$$J_{ij,k;q}^{sr} = \frac{1}{N_R} \frac{H_{j,k}(S_{j,k}(m) J_{i,k;q} - S_{i,k}(m) J_{i,j;q})}{(S_{j,k}(m))^2 \sum_{f_k(i,j)} |H_{i,k}|^2} \quad (20)$$

For the double ratio cost function shown in Equation (4) the Jacobian is given as:

$$J_{ij,kl;q}^{dr} = \frac{1}{(S_{j,k}(m) S_{i,l}(m))^2} [S_{j,k}(m) S_{i,l}(m)(S_{i,k}(m) J_{j,l;q} + S_{j,l}(m) J_{i,k;q}) - \\ S_{i,k}(m) S_{j,l}(m)(S_{j,k}(m) J_{i,l;q} + S_{i,l}(m) J_{j,k;q})] \quad (21)$$

for Equation (9) it is:

$$J_{ij,kl;q}^{dr} = \frac{\begin{bmatrix} S_{j,k}(m) S_{i,l}(m)(S_{i,k}(m) J_{j,l;q} + S_{j,l}(m) J_{i,k;q}) - \\ S_{i,k}(m) S_{j,l}(m)(S_{j,k}(m) J_{i,l;q} + S_{i,l}(m) J_{j,k;q}) \end{bmatrix}}{(S_{j,k}(m) S_{i,l}(m))^2 \sum_{f(i,j;k,l)} \left|\frac{H_{i,k} H_{j,l}}{H_{i,l} H_{j,k}}\right|^2}, \quad (22)$$

and the Jacobian for the cost function in Equation (10) is:

$$J^{dr}_{ij,kl;q} = \frac{H_{i,l}H_{j,k}\begin{bmatrix} S_{j,k}(m)S_{i,l}(m)(S_{i,k}(m)J_{j,l;q} + S_{j,l}(m)J_{i,k;q}) - \\ S_{i,k}(m)S_{j,l}(m)(S_{j,k}(m)J_{i,l;q} + S_{i,l}(m)J_{j,k;q}) \end{bmatrix}}{N(S_{j,k}(m)S_{i,l}(m))^2 \sum_{f(k,l)(i,j)} |H_{i,k}H_{j,l}|^2}$$ (23)

In step 310, the process verifies that both the inversion has converged appropriately, and the resulting image is geologically reasonable. The measure of data misfit is used, which is the difference between the field data being inverted, and the calculated model responses, to measure how well the inversion has converged. Clearly the smaller the misfit, the better the resulting model can explain the field data, and generally it is good for the data misfit to be close to an RMS estimate of the noise level. Determining if the resulting image is geologically reasonable is very subjective, and currently involves the interpreter to assess the image using their geologic, engineering and other geophysical knowledge to see if the results make sense. If neither or only one of these measures are satisfied, the user can either modify the starting model, the well geometry, or the data weighting and return the inversion.

Figure 6:
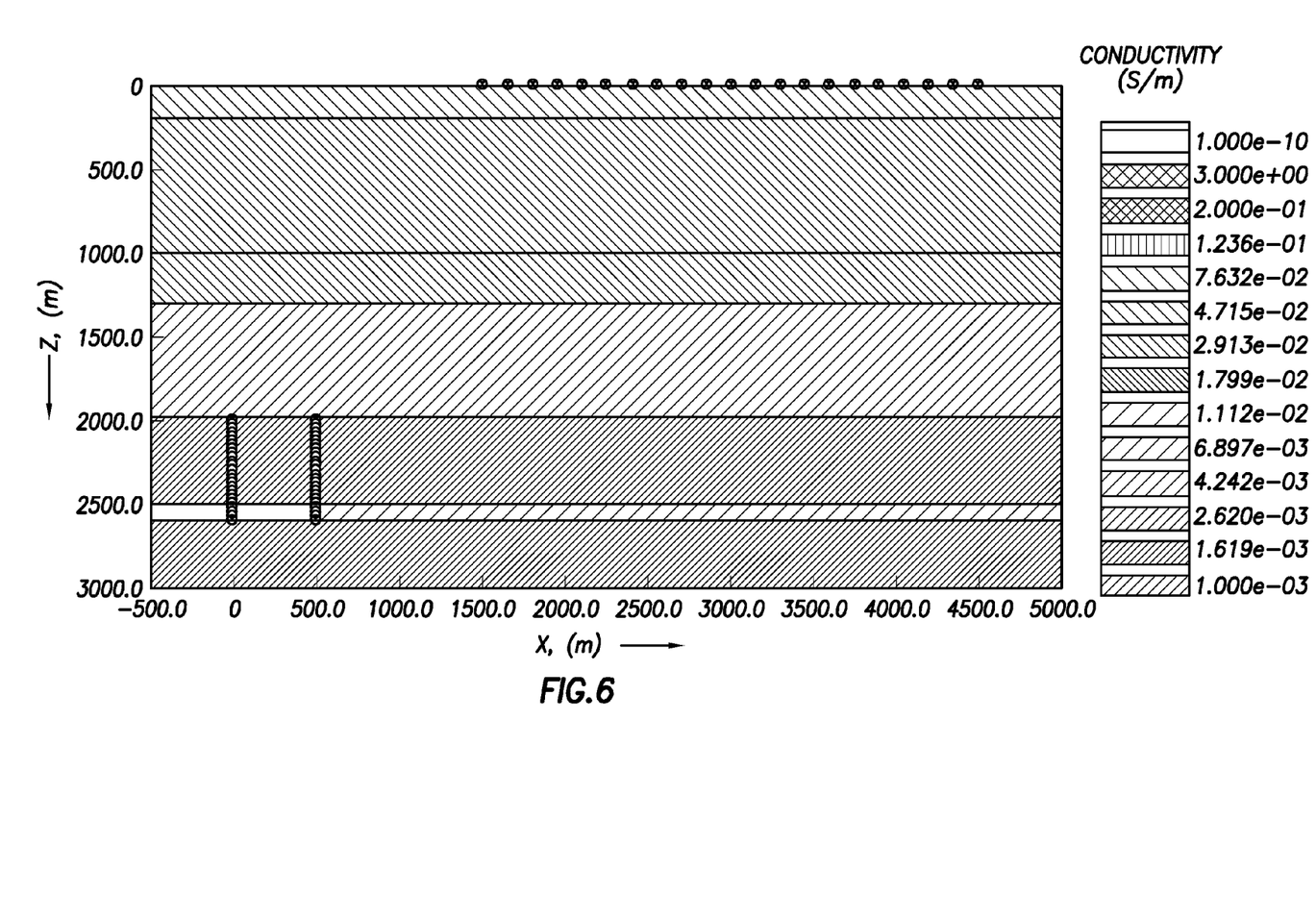
FIG. 6 illustrates a model used in sensitivity studies as illustrated in FIGS. 7 and 8.

A modeling study and field-data inversion example may be used to demonstrate this invention. The modeling study investigates two acquisition geometries, the CB and STB configurations. The analysis involves the use of 'sensitivity maps' that are provided by plotting the square-root of the main diagonal of the $J^TJ$ matrix as a function of position. This can be thought of as a summed sensitivity at a given point in the image domain, where the sum occurs over all transmitter-receiver combinations, and provides a quantitative way of estimating how sensitive a specific array geometry is to the geology at different points within the image domain. In both of these cases, it is assumed that the geology is two dimensional, and is invariant in the direction perpendicular to the image plane. In addition, sensitivity maps are compared for standard inversion procedures where the EM fields are inverted, and those produced by a ratio inversion approach. The model employed in this sensitivity study is illustrated in FIG. 6. Note that this shows both the surface-to-borehole and cross borehole configurations.

Figure 7A:
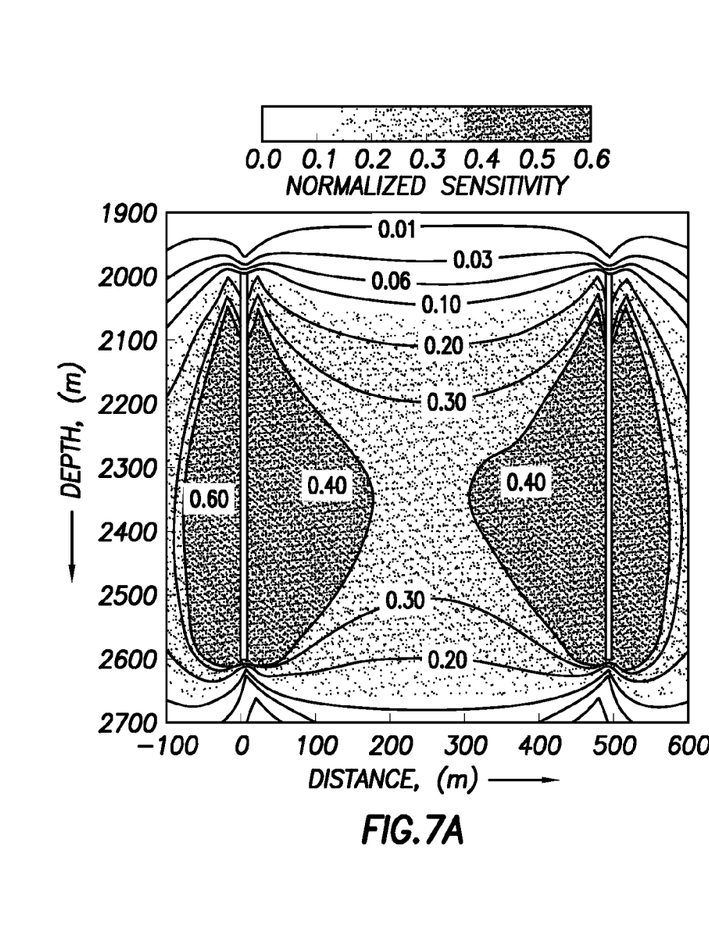
FIGS. 7A and 7B illustrate normalized sensitivity maps for the cross borehole array configuration shown in FIG. 6.
Figure 7B:
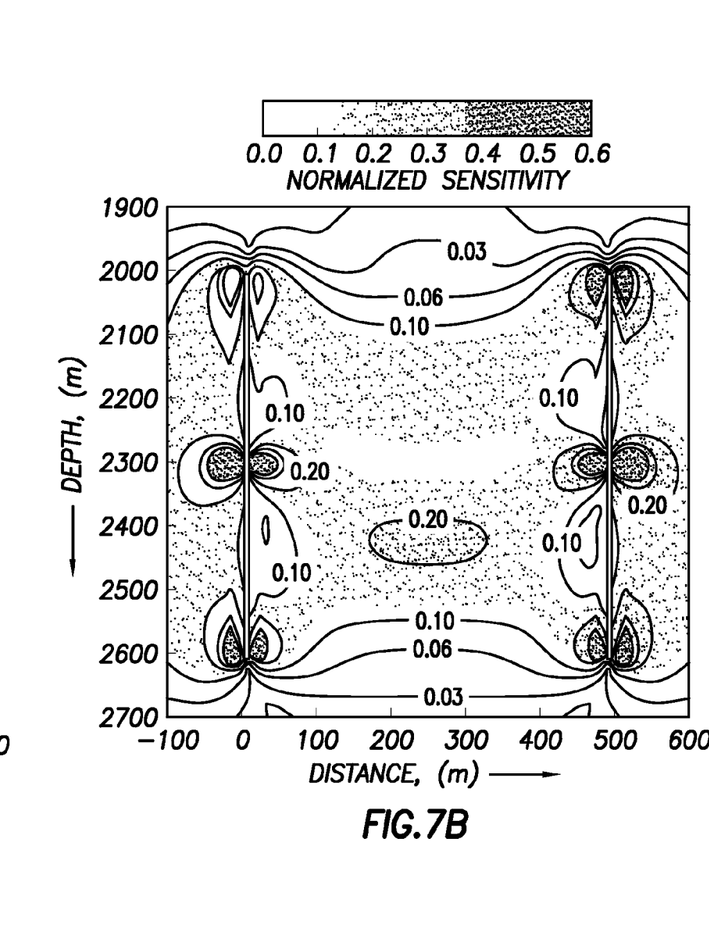
Figure 8A:
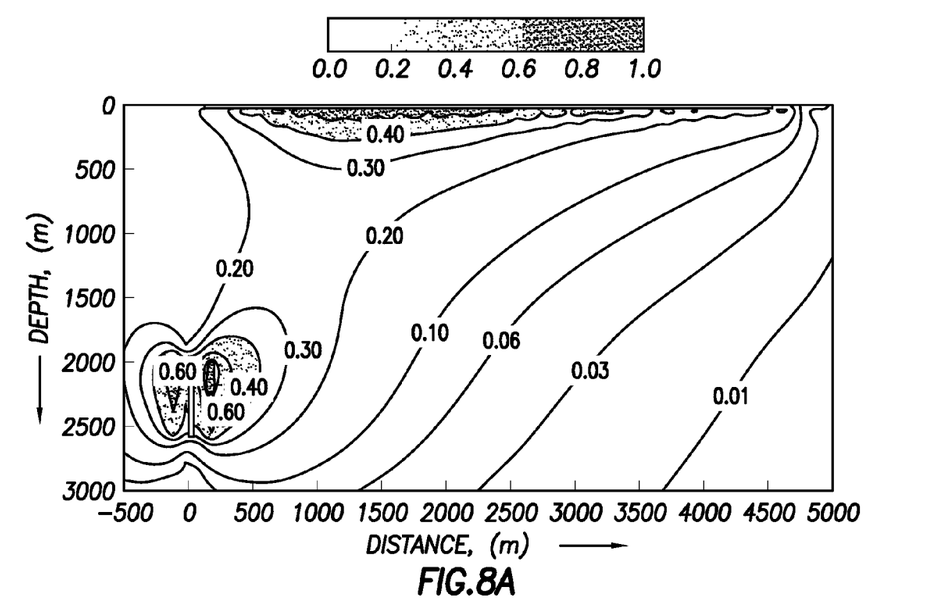
FIGS. 8A and 8B illustrate normalized sensitivity maps for the surface-to-borehole array configuration highlighted in FIG. 6.
Figure 8B:
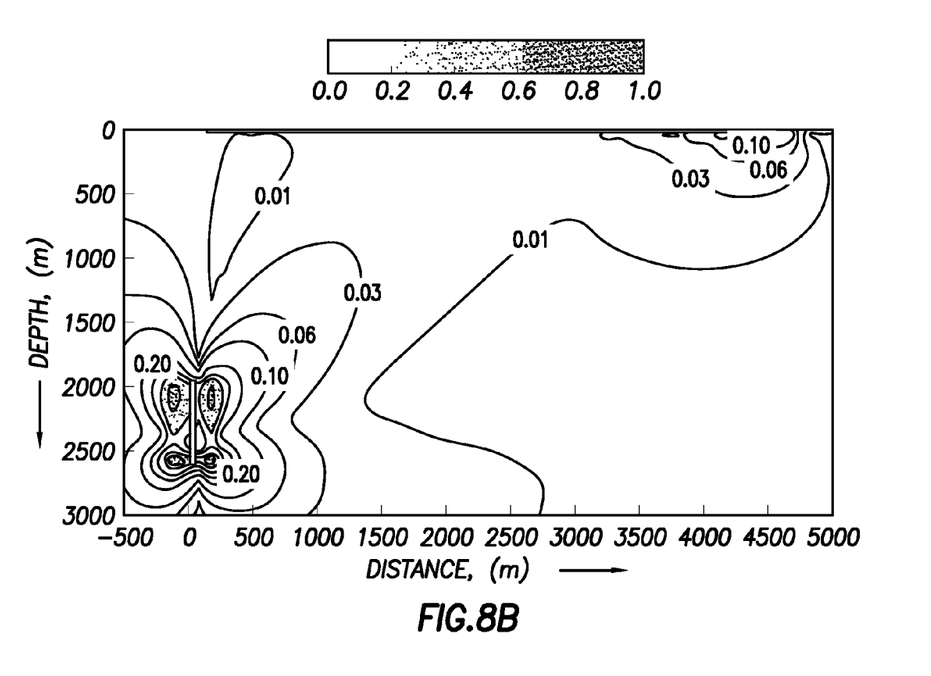

FIGS. 7A and 7B show the sensitivity map for both the normal cross borehole inversion (FIG. 7A), as well as the double ratio using the STRL normalization method (FIG. 7B). For the STRL double ratio, the transmitter and receiver points used in the normalization process are at 2300 m depth. The vertical white stripes are the location of the boreholes that contain 31 sources (right borehole) and 31 receivers (left borehole). Also note that the scale of these sensitivity maps goes from 0 to 0.6; the maximum value is 1.0, but the scales have been expanded here to show more features between the wells.

The results show that although the maximum normalized sensitivity for the ratio inversion is a factor of 1.5 to 2 times smaller in the region between the wells than that of the normal inversion of the EM fields, sensitivity to the near wellbore has been significantly reduced. In fact, for the ratio inversion, the maximum value of 1 exists near the wellbore only at the reference-sensor locations, while a value of 1 or close to unity is present along almost the entire well length for the normal inversion procedures. Thus, the ratio procedure not only removes the distortions caused by casing, but also sensitivity to near wellbore heterogeneity.

FIGS. 6A and 6B illustrates sensitivity maps for a STB configuration. The horizontal green stripe represents the location of 21 horizontal magnetic dipole sources, while the blue vertical line represents the location of 31 vertical magnetic field borehole receivers. FIG. 6A shows that in a standard configuration, a high degree of sensitivity exists near the surface. This indicates that large changes in the data could be induced by near surface heterogeneity as well as by cultural features such as pipes, metal fences, buildings, etc. However, as shown in FIG. 6B, the single STRL ratio technique significantly reduces the sensitivity to these near surface features while focusing the sensitivity down in the media around the borehole within the zone of interest.

Figure 9A:
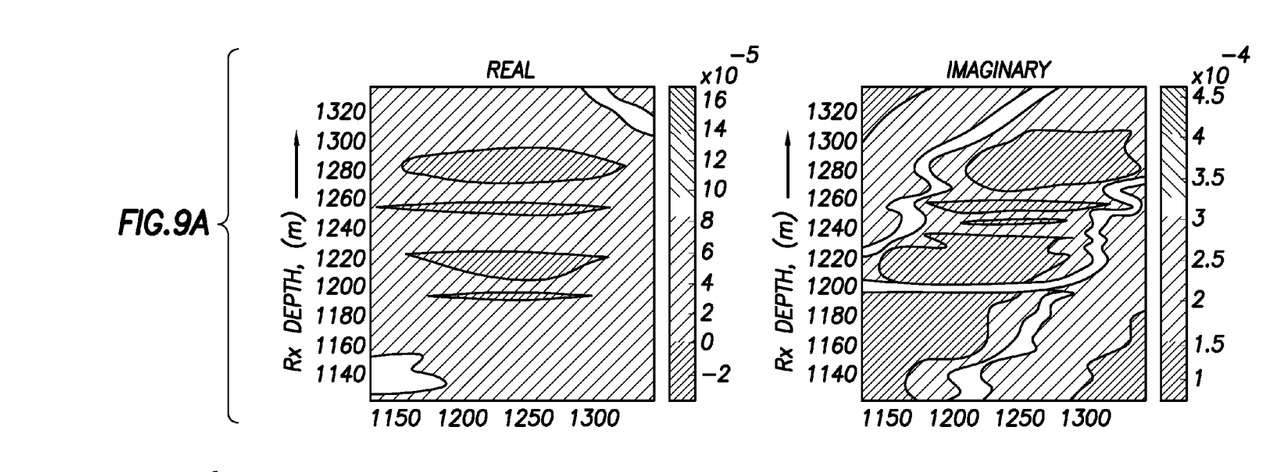
Figure 9B:
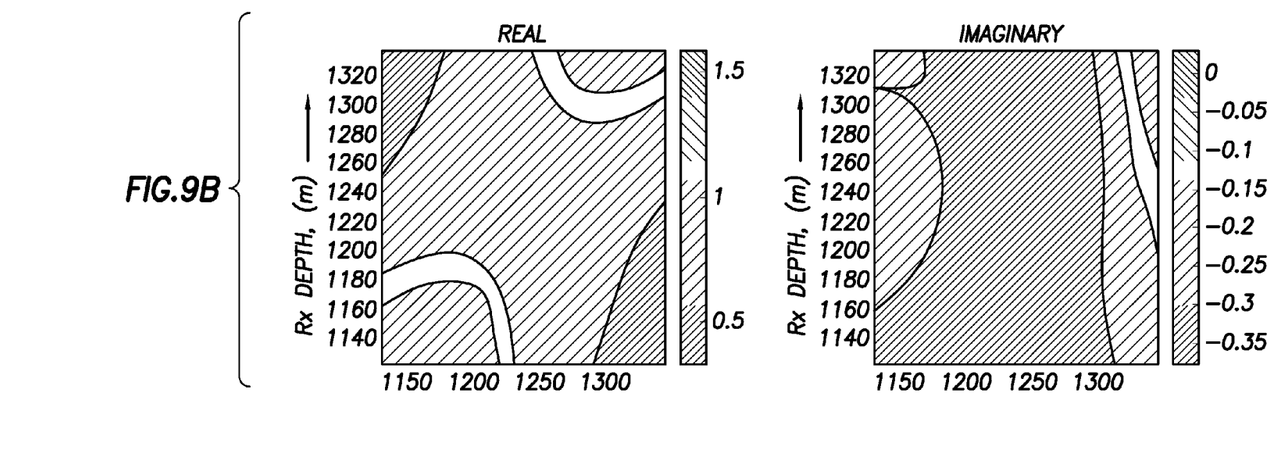
Figure 10A:
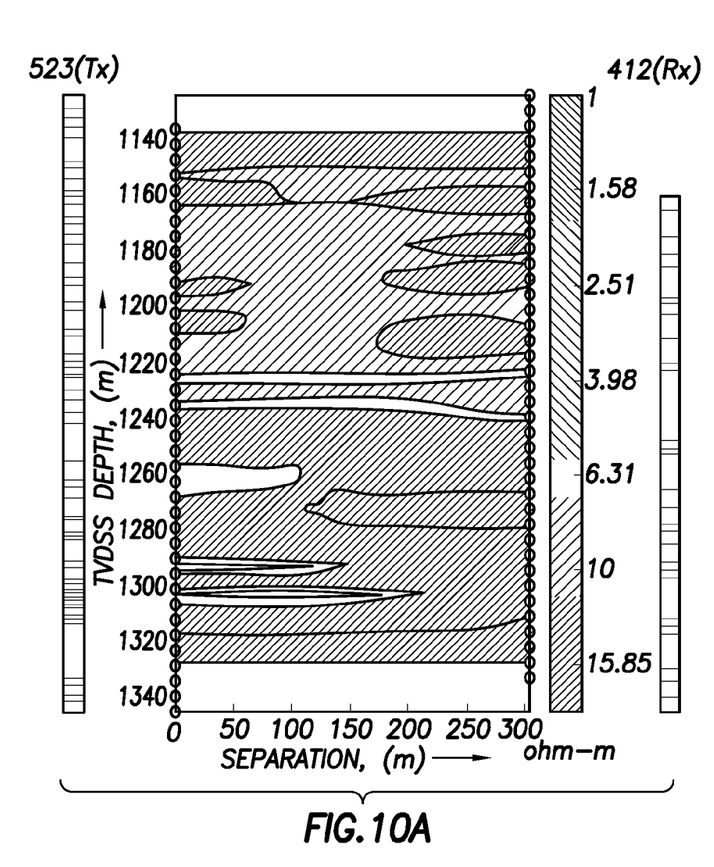
Figure 10B:
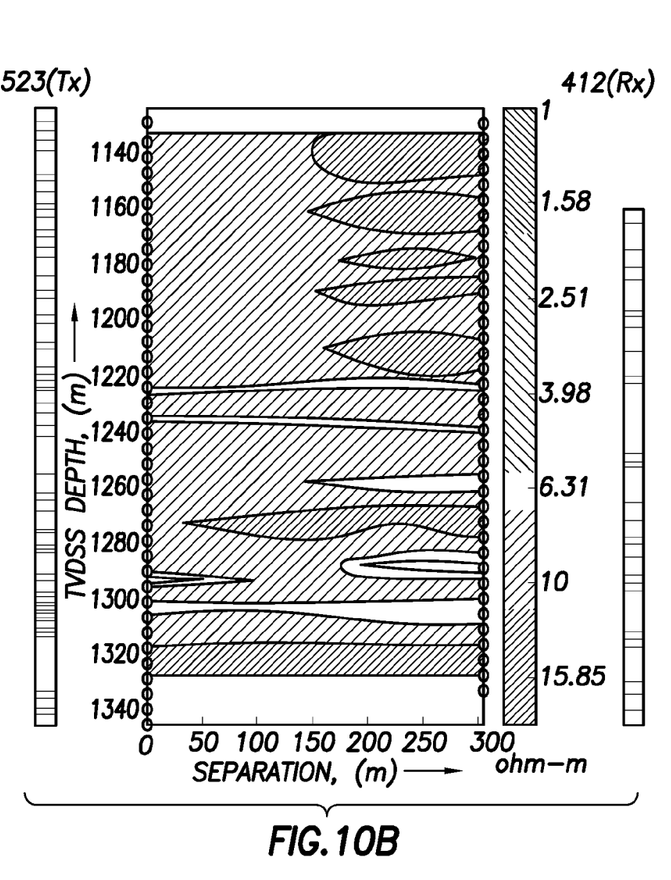
Figure 11A:
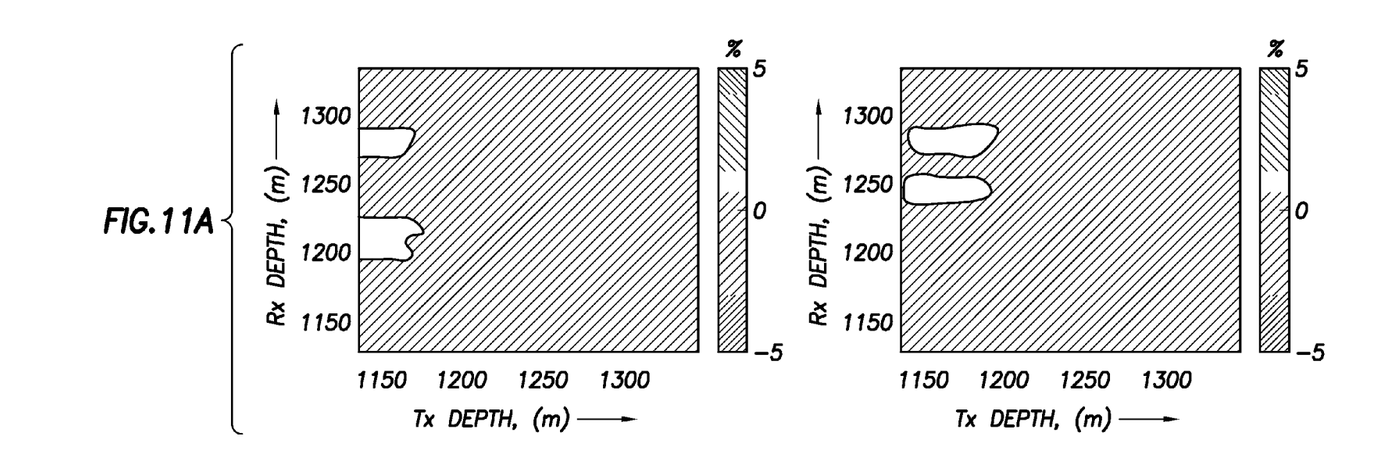
FIGS. 11A and 11B illustrate percent data residuals for the images in FIGS. 10A and 10B computed as described herein.
Figure 11B:
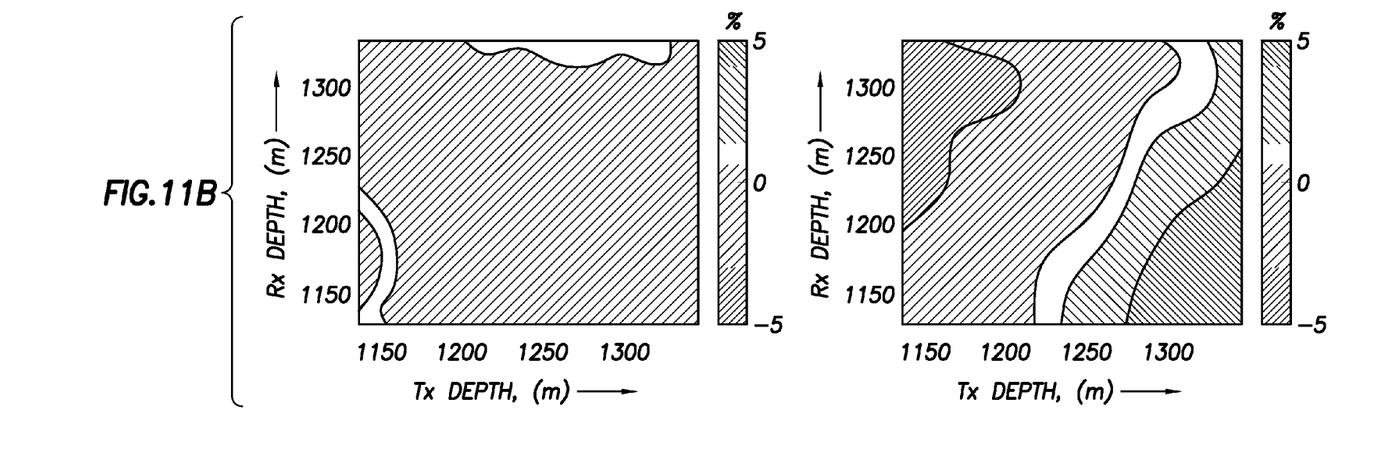

FIGS. 9 through 11 show the results of applying the double STRL ratio inversion to CB data where the receiver well was cased with steel. FIG. 9A shows the raw data; the horizontal striping is the result of heterogeneity in the casing causing distortions in the measured voltages. FIG. 9B shows the results of applying the double ratio. Note that the striping is almost entirely removed. The normalization positions are at 1240 m and 1227 m in the transmitter and receiver wells, respectively.

FIG. 10A shows the inversion results using the ratio method, while in FIG. 10B the image resulting from data calibrated by the model-based method described in U.S. Pat. No. 6,393,363 is displayed; these two images were both produced using the algorithm outlined in Farquharson, C. G. et al., *Non-linear inversion using general measures of data misfit and model structure*, Geophys. J. Int., 134, 213-227, 1998, which is hereby incorporated by reference herein. Notice the two images are very similar, but that there are observable differences. However the percent-residual-errors, which are defined as 100*(measured data−calculated data)/measured data, for the ratio inversion results show a random-like behavior as they should (FIG. 11A), while for the model-based method the distribution (FIG. 11B), the residuals indicate a non-random bias. The latter indicates that the calibrated data have likely been biased by an incorrect model employed in the correction scheme. Thus it is likely that FIG. 11A is the image closer to the true resistivity distribution.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

From the foregoing detailed description of specific embodiments of the invention, it should be apparent that a system and method for characterizing hydrocarbon reservoirs and ground-water aquifers that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method for characterizing a reservoir, comprising the steps of:
    normalizing measured voltage data by transmitter moment;
    sorting the normalized voltage data into common receiver profiles;

densely resampling transmitter locations using common positions for the common receiver profiles;

coarsely resampling the normalized voltage data at discrete transmitter locations;

defining a starting model for inversion;

weighting the normalized voltage data by a factor;

converting the normalized voltage data to ratios;

calculating a conductivity image using a ratio inversion method; and verifying that an inversion has converged.

2. The method as recited in claim 1, further comprising the step of removing outlier results from each of the receiver profiles.

3. The method as recited in claim 2, further comprising the step of displaying the conductivity image.

4. The method as recited in claim 3, wherein the step of normalizing measured voltage data by transmitter moment does so by a value that tracks the transmitter moment, wherein the value is measured transmitter current.

5. The method as recited in claim 3, wherein the step of normalizing measured voltage data by transmitter moment does so by a value that tracks the transmitter moment, wherein the value is a voltage produced in a secondary solenoid wrapped around a transmitting solenoid.

6. The method as recited in claim 3, wherein a common receiver profile comprises measurements made during one of a crosswell, surface-to-borehole, or borehole-to-surface electromagnetic survey with a receiver fixed at a given depth.

7. The method as recited in claim 3, wherein the step of densely resampling transmitter locations using common positions for the receiver profiles further comprises the steps of:

defining a common transmitter depth interval for all of the receiver profiles;

determining a minimum spatial sampling interval among all of the receiver profiles and using them to define transmitter positions that will be employed for all receiver profiles; and using a spline technique to interpolate the data from actual measurement locations to global locations.

8. The method as recited in claim 3, wherein the step of coarsely resampling the data at discrete transmitter locations further comprises selecting a subset of values output from the step of densely resampling transmitter locations using common positions for the receiver profiles using a depth-interval between adjacent transmitter points that is approximately equal to a minimum receiver sampling interval that is employed.

9. A system for characterizing a reservoir, comprising:

a plurality of electromagnetic transmitters and receivers, one or more of which are disposed within a wellbore positioned relative to the reservoir to be characterized;

means for normalizing measured voltage data by transmitter moment;

means for sorting the normalized voltage data into common receiver profiles;

means for densely resampling transmitter locations using common positions for the receiver profiles;

means for coarsely resampling the data at discrete transmitter locations;

means for defining a starting model for inversion;

means for weighting the data by a factor;

means for converting the normalized voltage data to ratios; and means for calculating a conductivity image using a ratio inversion method.

10. The system as recited in claim 9, further comprising means for displaying the conductivity image.

11. The system as recited in claim 9, wherein the means for normalizing measured voltage data by transmitter moment does so by a value that tracks the transmitter moment, wherein the value is measured transmitter current.

12. The system as recited in claim 9, wherein a common receiver profile comprises measurements made during a one of a crosswell, surface-to-borehole, or borehole-to-surface electromagnetic survey with a receiver fixed at a given depth.

13. The system as recited in claim 9, wherein the means for densely resampling transmitter locations using common positions for the receiver profiles further comprises:

means for defining a common transmitter depth interval for all of the receiver profiles;

means for determining a minimum spatial sampling interval among all of the receiver profiles and using them to define transmitter positions that will be employed for all receiver profiles; and means for using a spline technique to interpolate the data from actual measurement locations to global locations.

14. A computer program product embodied in a computer storage medium, the computer program product operable for characterizing a reservoir, comprising the program steps of:

normalizing measured voltage data by transmitter moment;

sorting the normalized voltage data into common receiver profiles;

densely resampling transmitter locations using common positions for the receiver profiles;

coarsely resampling the normalized voltage data at discrete transmitter locations;

defining a starting model for inversion;

weighting the normalized voltage data by a factor;

converting the normalized voltage data to ratios;

calculating a conductivity image using a ratio inversion method; and verifying that an inversion resulting from the ratio inversion method has converged.

15. The computer program product as recited in claim 14, further comprising the program step of removing outlier results from each of the receiver profiles.

16. The computer program product as recited in claim 14, further comprising the program step of displaying the conductivity image.

17. The computer program product as recited in claim 16, wherein the program step of normalizing measured voltage data by transmitter moment does so by a value that tracks the transmitter moment, wherein the value is measured transmitter current.

18. The computer program product as recited in claim 16, wherein the program step of normalizing measured voltage data by transmitter moment does so by a value that tracks the transmitter moment, wherein the value is a voltage produced in a secondary solenoid wrapped around a transmitting solenoid.

19. The computer program product as recited in claim 16, wherein the program step of densely resampling transmitter locations using common positions for the receiver profiles further comprises the program steps of:

defining a common transmitter depth interval for all of the receiver profiles;

determining a minimum spatial sampling interval among all of the receiver profiles and using them to define transmitter positions that will be employed for all receiver profiles; and using a spline technique to interpolate the data from actual measurement locations to global locations.

20. The computer program product as recited in claim 16, wherein the program step of coarsely resampling the data at discrete transmitter locations further comprises selecting a subset of values output from the step of densely resampling transmitter locations using common positions for the receiver profiles using a depth-interval between adjacent transmitter points that is approximately equal to a minimum receiver sampling interval.

21. A method, comprising:

positioning a plurality of electromagnetic transmitters and receivers within a wellbore positioned relative to a reservoir to be characterized;

normalizing measured voltage data by transmitter moment;

sorting the normalized voltage data into common receiver profiles;

densely resampling transmitter locations using common positions for the receiver profiles;

coarsely resampling the data at discrete transmitter locations;

defining a starting model for inversion;

weighting the data by a factor;

converting the normalized voltage data to ratios; and calculating a conductivity image using a ratio inversion method.

* * * * *